Dec. 22, 1964  M. W. LOVELAND  3,162,225
FRUIT CORER

Filed April 23, 1963  12 Sheets-Sheet 4

INVENTOR.
MALCOLM W. LOVELAND
BY
ATTORNEYS

Dec. 22, 1964  M. W. LOVELAND  3,162,225
FRUIT CORER

Filed April 23, 1963  12 Sheets-Sheet 7

INVENTOR.
MALCOLM W. LOVELAND
BY
ATTORNEYS

INVENTOR.
MALCOLM W. LOVELAND
BY
ATTORNEYS

Dec. 22, 1964   M. W. LOVELAND   3,162,225
FRUIT CORER
Filed April 23, 1963   12 Sheets-Sheet 9

INVENTOR.
MALCOLM W. LOVELAND
BY
ATTORNEYS

Dec. 22, 1964  M. W. LOVELAND  3,162,225
FRUIT CORER
Filed April 23, 1963  12 Sheets-Sheet 10

INVENTOR.
MALCOLM W. LOVELAND
BY
ATTORNEYS

Dec. 22, 1964  M. W. LOVELAND  3,162,225
FRUIT CORER
Filed April 23, 1963  12 Sheets-Sheet 12

FIG. 15.

| | 0° | | | | 180° | | 360° |
|---|---|---|---|---|---|---|---|
| CUP INDEX | | A | | | 180° | B | 180° |
| CONVEYOR LOCK | | A 4° | B | 156° | | C 24° D | 156° E 20° |
| CORING TUBE | | A 5° C 10° B | 66° | | D | 90° | E 189° |
| CORE KNOCK-OUT ROD | | A 10° | B | 120° | | C | 120° D 110° |
| PLUNGER LIFT | | A | 71° | B 10° C 38° | D 30° E 32° | F | 179° |
| CUP JAW CONTROL-STATION I | | A | 60° | B 18° C | 50° | D 18° E | 214° |
| SEED POD REMOVAL HEAD | | A | 52° | B | 52° C 6° D 18° E | 64° F | 156° G 12° |
| CUP JAW CONTROL-STATION VII | | A | 50° | B 40° | C | 90° D | 88° E 92° |

INVENTOR.
MALCOLM W. LOVELAND
BY
*His* ATTORNEYS

United States Patent Office 3,162,225
Patented Dec. 22, 1964

3,162,225
FRUIT CORER
Malcolm W. Loveland, Orinda, Calif., assignor to Atlas Pacific Engineering Company, a corporation of California
Filed Apr. 23, 1963, Ser. No. 274,969
10 Claims. (Cl. 146—52)

This invention relates in general to apparatus for coring fruit, and more particularly to apparatus capable of removing the seed pod and the core from fruit irrespective of the size of the fruit being processed.

Removing a seed pod from a pear with automatic machinery presents various difficulties in that the fruit may vary substantially in size, thus requiring that the knife which performs the actual cutting of the interior penetrate greater or lesser distances into the fruit, if ideal results are to be obtained.

It is an object of this invention to provide apparatus capable of inserting a knife into one end of a pear, moving it longitudinally through the core until a point is reached where the knife is in the immediate vicinity of the seed pod, and then executing a rotary cutting action so as to free the seed pod.

A further object of this invention is to provide a machine capable of cutting free the seed pods of pears, which machine is self-adjusting to be capable of cutting in the appropriate area of the interior of a pear irrespective of the size of the pear.

Still another object of this invention is to provide apparatus which is capable of coring pears.

A further object of this invention is to provide means for holding a pear in the proper orientation relative to coring and seed pod removal apparatus and for presenting the fruit to this apparatus, the holding means being adjustable to accommodate fruit of various sizes.

Ancillary objects and advantages of this invention, if not specifically set forth, will become apparent during the course of the description which follows.

Generally, this invention comprises conveyor-mounted cups, each cup incorporating a pair of gripper elements, at least one of which is horizontally movable to accommodate various sized fruits, sensing apparatus positioned along the path of travel of the conveyor supporting the cups, which apparatus is capable of determining the position of a movable gripper element (and hence the size of a pear held thereby), and means operatively associated with the size sensing apparatus to govern the depth to which a seed pod removal knife penetrates the pear and the quantity of core material cut free by the action of the seed pod removal knife. Thus, with a smaller pear, the knife enters the pear a lesser distance than would be permitted if the pear is of a larger diameter, and also cuts out a smaller quantity of core material. In order to minimize the required vertical travel of the knife and otherwise to facilitate the entire operation the base of each cup is also capable of being raised so as to permit pears of all sizes to be supported with their uppermost surfaces in the same plane. Means are also provided for removing the core portion of the pear which is not freed by the use of the speed pod severing knife described above.

In the drawings:

FIGURE 15 is a timing chart for the machine.

Figure 1:
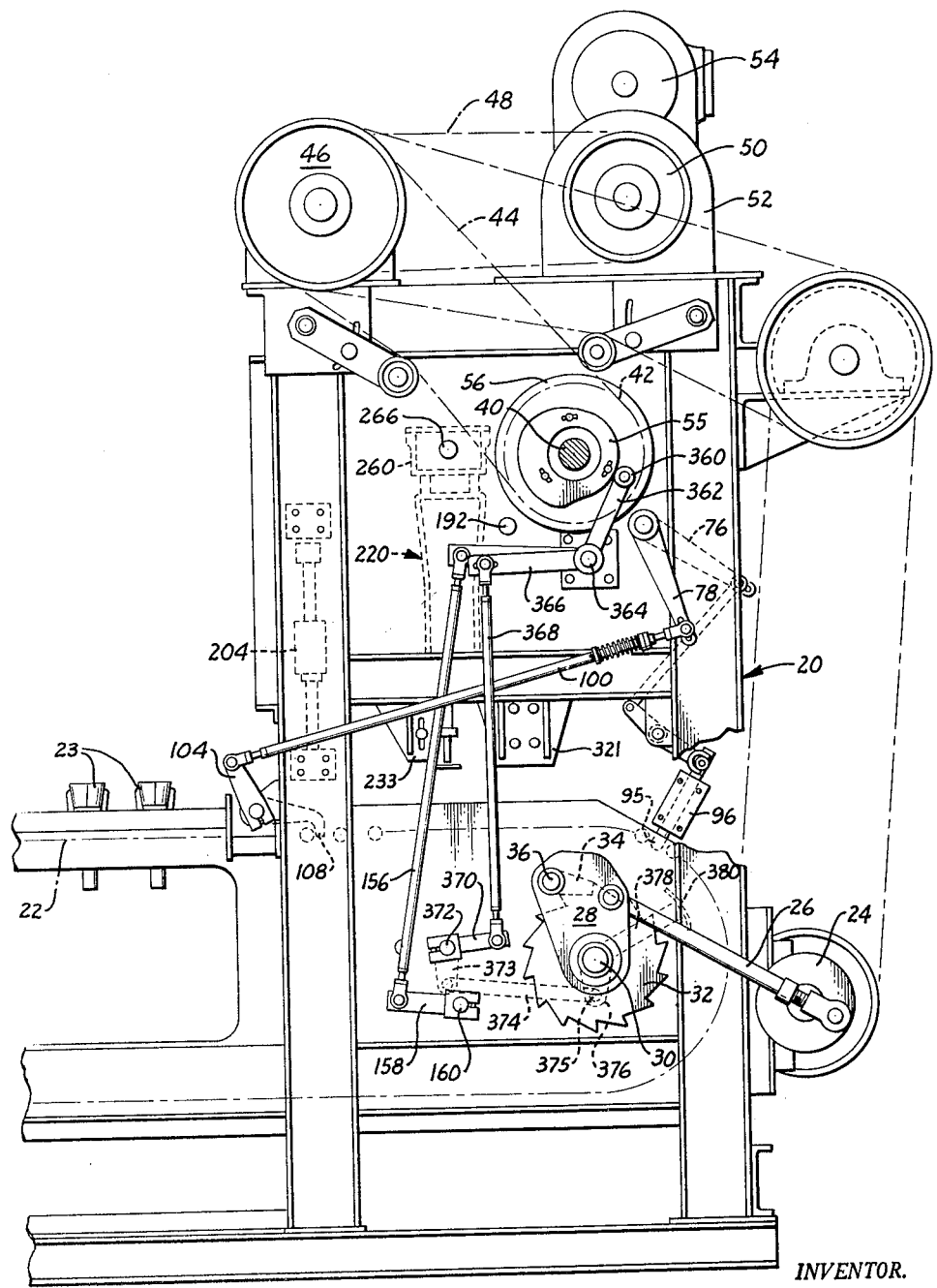
FIGURE 1 is a side elevation of the apparatus of this invention.

Referring now to the drawings wherein like characters refer to like parts throughout, there is shown in FIGURE 1 a frame 20 providing support for one end of an endless chain conveyor 22 which supports cup assembly 23. The conveyor is advanced in an intermittent fashion by eccentric 24 through connecting rod 26 to the plate 28 which is rotatably mounted about the shaft 30, which shaft is journalled in bearings at either side of the structure and supports the sprocket about which is trained the conveyor chain 22. Ratchet wheel 32 is mounted immediately behind the plate 28 and is geared to the sprocket of conveyor 22 so that clockwise movement, as seen in FIGURE 1, of the ratchet wheel 32 will advance the sprocket and the chain conveyor 22. Dog 34 pivotally secured at 36 to the plate engages notches in the ratchet wheel 32 whenever the plate 28 is moved in a clockwise fashion.

Figure 3:
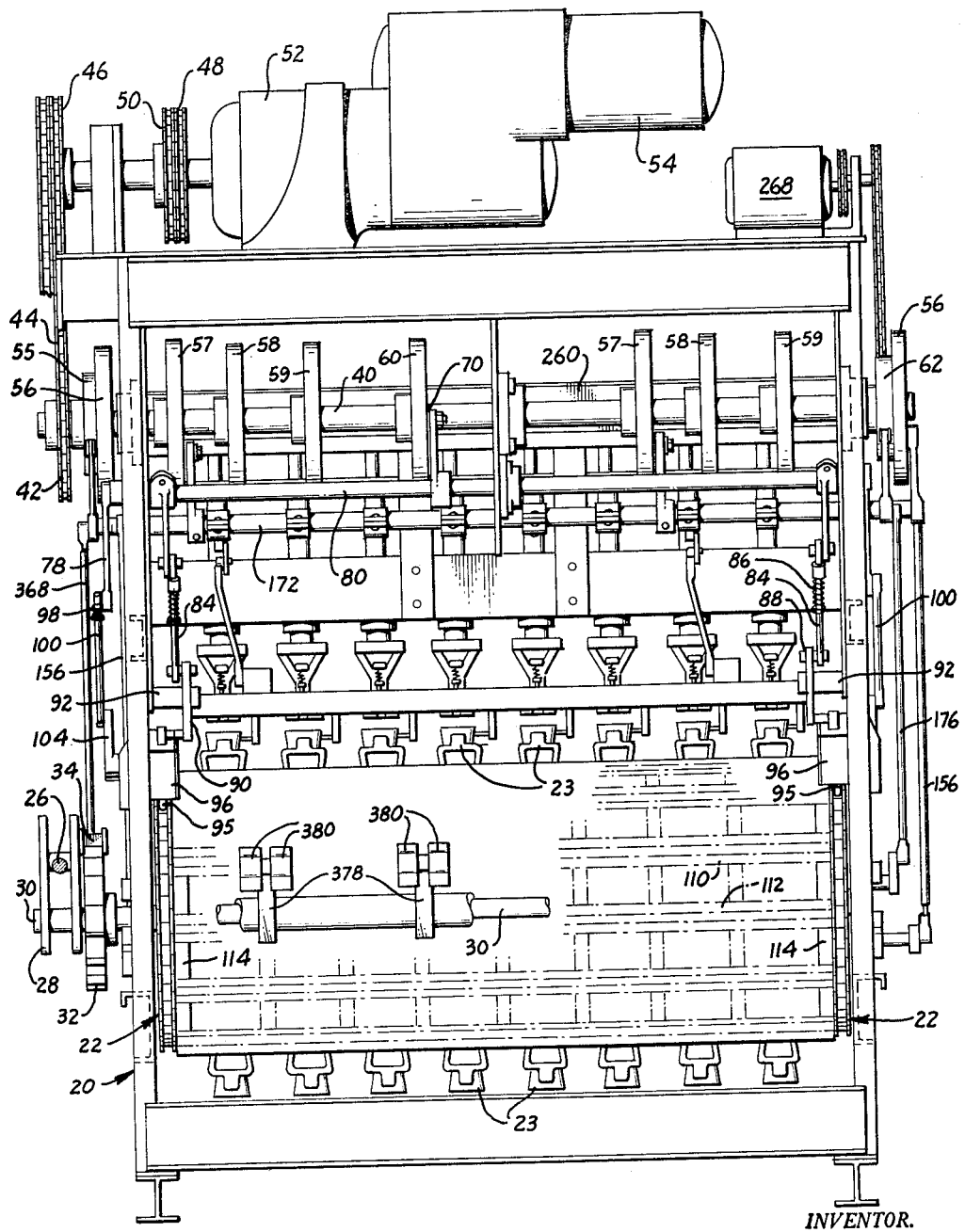
FIGURE 3 is an end elevation of the apparatus of this invention.
Figure 13:
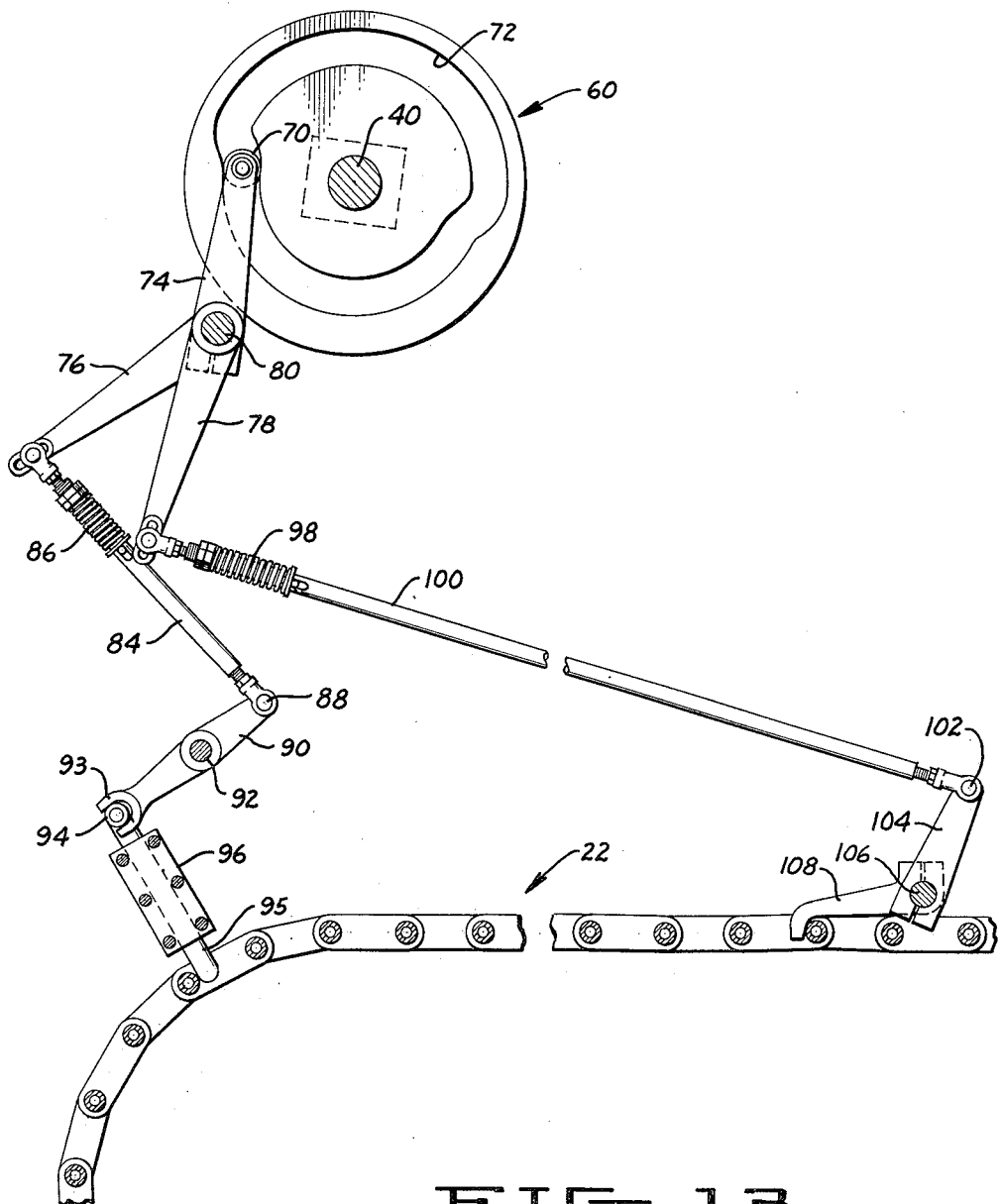
FIGURE 13 is an enlarged side elevation of a cam and associated apparatus for locking the endless conveyor carrying the pear cups so that various operations may be performed while a pear is held stationary.
Figure 14:
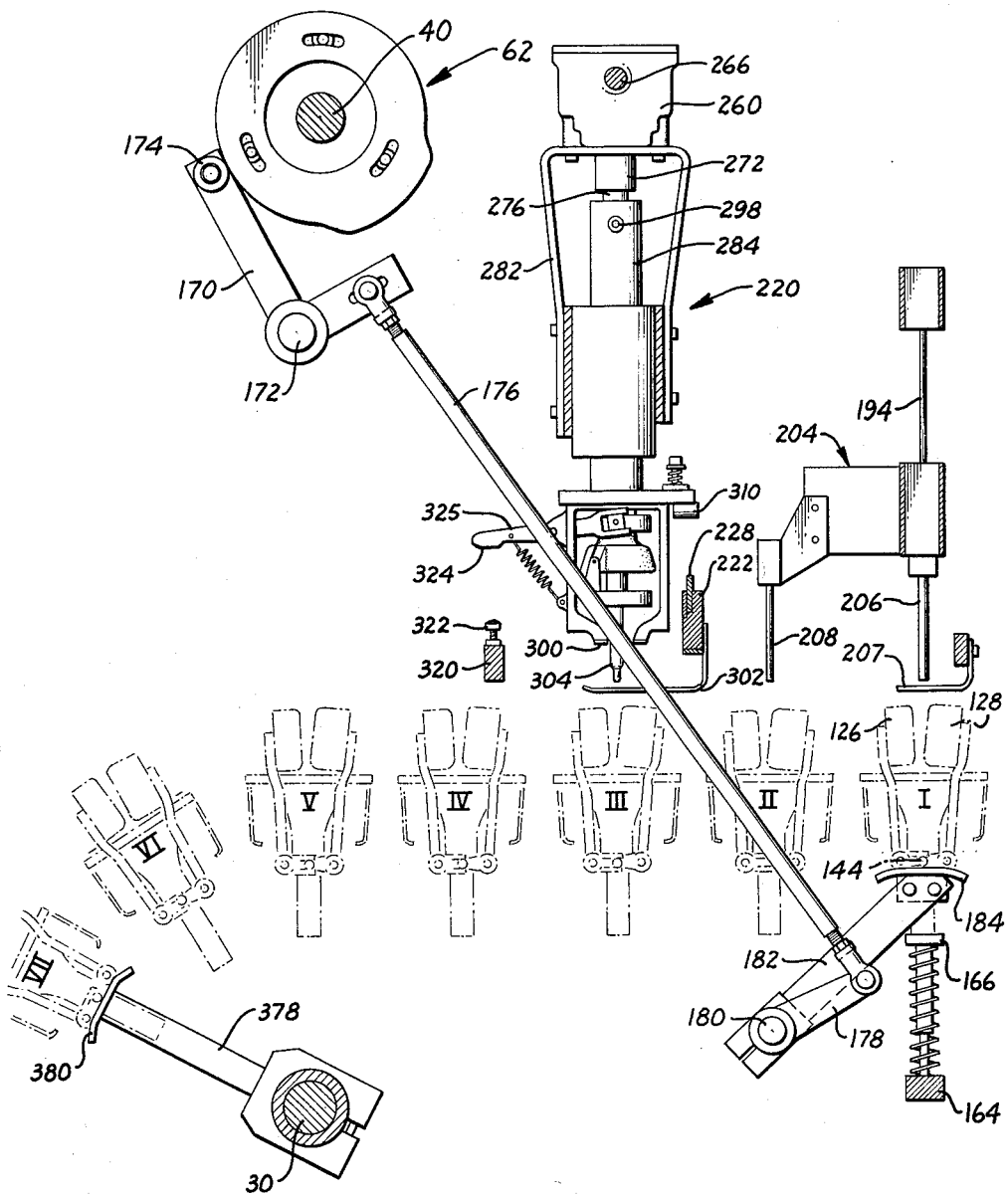
FIGURE 14 is an enlarged side elevation of a cam and associated apparatus which serve to partially open cups containing pears so as to permit the butt ends of pears to be adjusted to a predetermined level.

As seen particularly in FIGURE 3, a plurality of cams control the various operations. Journalled in bearings supported by the frame is a shaft 40 having keyed thereto drive sprocket 42 about which is trained chain 44, in turn trained about sprocket 46 driven by chain 48 from sprocket 50 of the gear reduction box 52 of the prime mover 54. Suitable means for adjusting the tension on chain 44 is provided. Keyed to the shaft 40 are each of cams 55 (FIGURES 1 and 3), cams 56 (FIGURES 3 and 9), cams 57 (FIGURES 3 and 10), cams 58 (FIGURES 3 and 11), cams 59 (FIGURES 3 and 12) and cam 60 (FIGURES 3 and 13). Also keyed to the shaft 40 are exterior cams 62 (FIGURES 3 and 14).

Conveyor Locking Mechanism

Attention is directed particularly to FIGURES 3 and 13. As shaft 40 rotates, cam 60 is rotated and the follower 70 rides in the track 72. Each of the arms 74, 76 and 78 are keyed to the shaft 80 which is journalled in frame 20. The connecting rod 84 having on one end thereof compression spring 86 is pivoted at 88 to the rocker arm 90 which pivots about pin 92 in the frame 20. The fork 93 on one end of the rocker arm surrounds roller 94 and thereby controls operation of the detent 95 which is slideably mounted in box 96 secured to the frame 20. The exposed end of the detent 95 is of suitable size to fit between the cross pieces of the links of the conveyor chain 22. This arrangement is duplicated on either side of the machine.

Pivoted to arm 78 is the compression spring 98 secured to one end of connecting rod 100. At the other end of rod 100 is wrist pin 102 to which is pivoted arm 104. Fixed relative to arm 104 by being secured to pin 106 is the detent 108, having a tip of suitable size to fit between the cross pieces of the conveyor chain. This arrangement is also duplicated on either side of the machine. It will be seen that as cam 60 rotates, the detents 95 and 108 will be raised and lowered simultaneously so as to permit movement of the chain conveyor 22 or so as to lock the conveyor in place for a predetermined period of time. Stoppage of forward motion of the conveyor 22 permits various operations to be performed on the fruit being processed while the fruit is stationary.

Fruit Holding Cups

Figure 4:
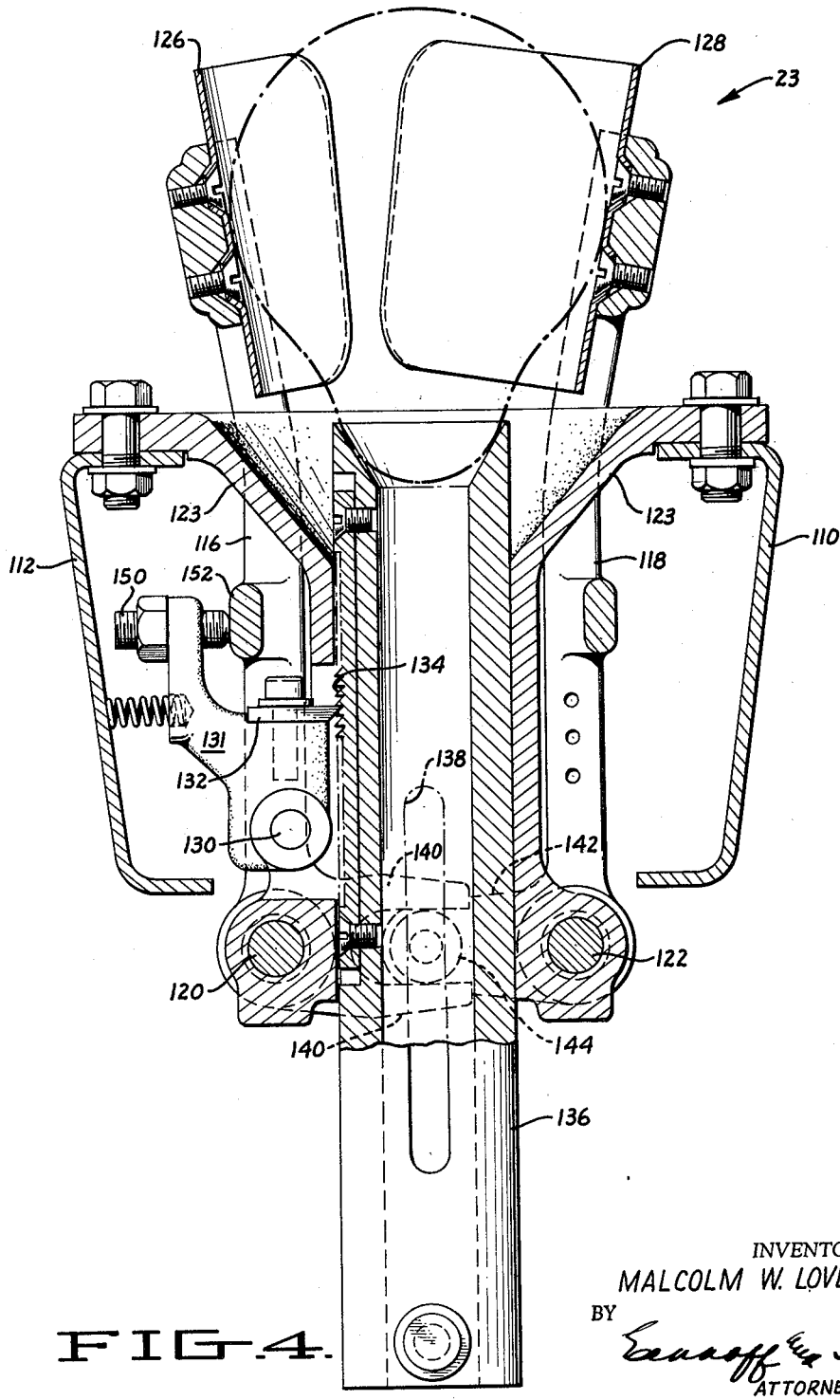
FIGURE 4 is an enlarged sectional side elevation of one of the cups used to support a pear.

Each cup, generally 23, is bolted to a pair of transverse channels 110 and 112 secured to brackets 114 carried by the links of chain 22. Each cup assembly has a pair of bell crank arms 116 and 118 pivoted about pins 120 and 122, in turn secured in elongated tubular housing 123. Each of the crank arms supports a trough-shaped jaw 126 or 128 which are urged closed by spring 129. Similarly pivotally mounted relative to the housing 123 about pin 130 is member 131 having a dog 132 thereon which may be caused to register with a tooth of ratchet 134 secured to plunger 136. Plunger 136 provides support for the stem end of a pear and can be pushed upwardly from below and locked at a point where it contacts the stem end of a pear and positions the butt end of any size pear in the same predetermined plane irrespective of the length of the pear. Plunger 136 telescopes into the interior of housing 123 and is held therein by means of a pin passing through the slot 138 into the side wall of the housing 123. A toggle mechanism consisting of fork 140 and arm 142 carrying roller 144 provides means to spread jaws 126 or 128 by applying upward pressure on roller 144. The uppermost extension of member 131 supports the adjustment screw 150, the forward end of which rests against boss 152 on the arm 116 so that as the finger 126, as seen in FIGURE 4, is rotated counter-clockwise, the dog 132 will be withdrawn from the ratchet 134 and telescoping plunger 136 permitted to fall under the influence of gravity to a rest position. Upward movement of each plunger 136 so as to find and possibly raise the stem ends of pears held by sets of jaws 126 and 128 is accomplished through the action of cams 56 which govern the motion of bell cranks 153 as the rollers 154 move in the cam tracks 155. Connecting rods 156 are secured to the distal ends of the bell cranks and these in turn control lever arms 158 keyed to rotatable shaft 160 journalled in the frame 20 and running transversely thereof. Levers 162 are similarly keyed to shaft 160 and at their distal ends rest beneath transverse vertically-reciprocating bar 164 supporting the resiliently-mounted lifter plate 166. These, on counter-clockwise rotation of lever 162 (FIGURE 9), are lifted by bar 164 to raise telescoping plungers 136 in the cup assemblies. The resilient mounting assures against damaging the fruit by continued application of pressure from below after the butt end of a pear has reached its predetermined plane.

At various stages, the jaws 126 and 128 must be partially opened or closed and this is accomplished by cam assembly shown in detail in FIGURE 14 which consists of the cam also seen in FIGURE 3, which is mounted exterior to the frame 20 on the shaft 40. Bell crank 170 which pivots about shaft 172 in the frame 20 has follower 174 which rides on the exterior of cam 62. Connecting rod 176 controls the action of arm 178 keyed to shaft 180 journalled in the frame 20. Also keyed to the shaft 180 is arm 182 which supports arcuate cam 184. A plurality of the arms 182 and cams 184 are provided, one being positioned in the path of each of the rollers 144. The action of the cam 62 is so timed that the cam 184 will contact a roller 144 and the arm 182 will be rotated in a counter-clockwise direction, as seen in FIGURE 14, so as to open the jaws 126 and 128 at the moment when it is desired to lift the plunger 136 through the action of the assembly shown in FIGURE 9.

Coring Tube and Pear Core Removal

Figure 11:
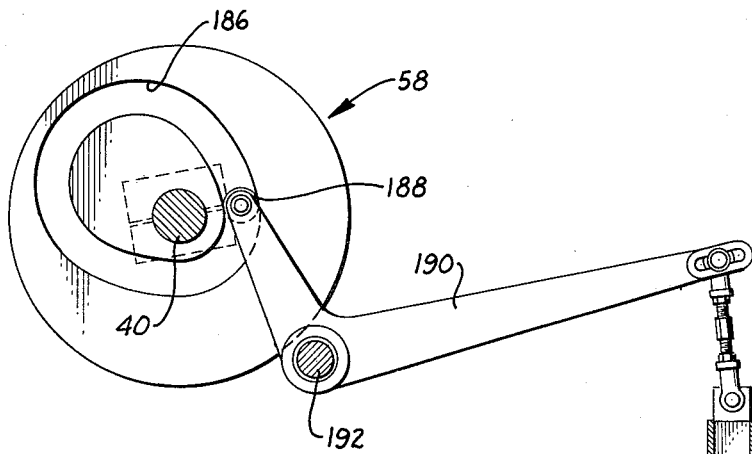
FIGURE 11 is an enlarged side elevation of a cam and punch used to remove the core material from the center of the pear.
Figure 12:
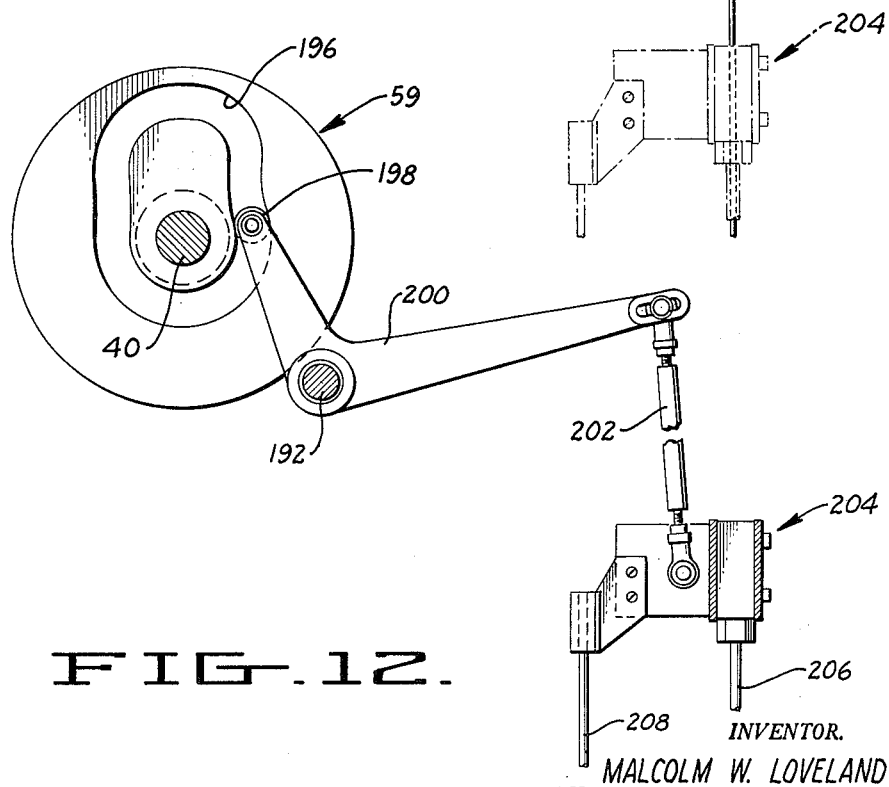
FIGURE 12 is an enlarged side elevation of a cam used to control a coring tube and punch assembly.

As seen in FIGURE 12, and as also seen in FIGURE 14, means are provided for cutting a cylinder of material from the core of the pear and for removing it after it has been cut free of the rest of the fruit. In FIGURES 11 and 12, the cams which are used to control the core cutting and punching mechanisms are seen. Cams 58 clamped to shaft 40 have tracks 186 in which ride the rollers 188. Bell crank 190 is pivotally mounted on shaft 192 to the distal end of which is secured a transverse bar supporting the punch 194.

Cams 59 also have tracks 196 in which ride the rollers 198 of the bell crank 200 pivotally mounted on the shaft 192. The distal end of this bell crank is fixed to the supporting rod 202 for the auxiliary punch and coring tube assembly generally designated 204. This consists of a hollow coring tube 206 and a punch 208. Each of punches 194 and 208 may be needed with certain types of pears as will be detailed further hereinafter. The construction and operation of the apparatus is such that, as seen in FIGURE 14, the punch 194 telescopes within the coring tube 206 so that after a pear core has been cut by the downward motion on the part of coring tube 206, the solid punch 194 may be used to drive the core out of the pear entirely or in part. V-shaped stripper 207 (FIGURE 14) cooperates with tube 206 in a manner to be detailed below. Cutting of the core must be completed before the punch 194 may contact the fruit and in view of the limited time in which to perform these two actions before the conveyor moves the fruit, it may be desirable to employ a separate punch mechanism 208 which completely frees the severed core from the fruit at a later time.

Seed Pod Removal Apparatus

In addition to the core which is removed through the coaction of coring tube 206 and punch 194 with perhaps the assistance of punch 208, there are also provided means for removing the pear seed pod. These means consist generally of a coring head assembly, generally 220, seen in FIGURE 5, and a portion of which is seen in enlarged sectional side elevation in FIGURES 6 and 8. The general location of the coring head assembly is also seen in FIGURE 14.

Figure 6:
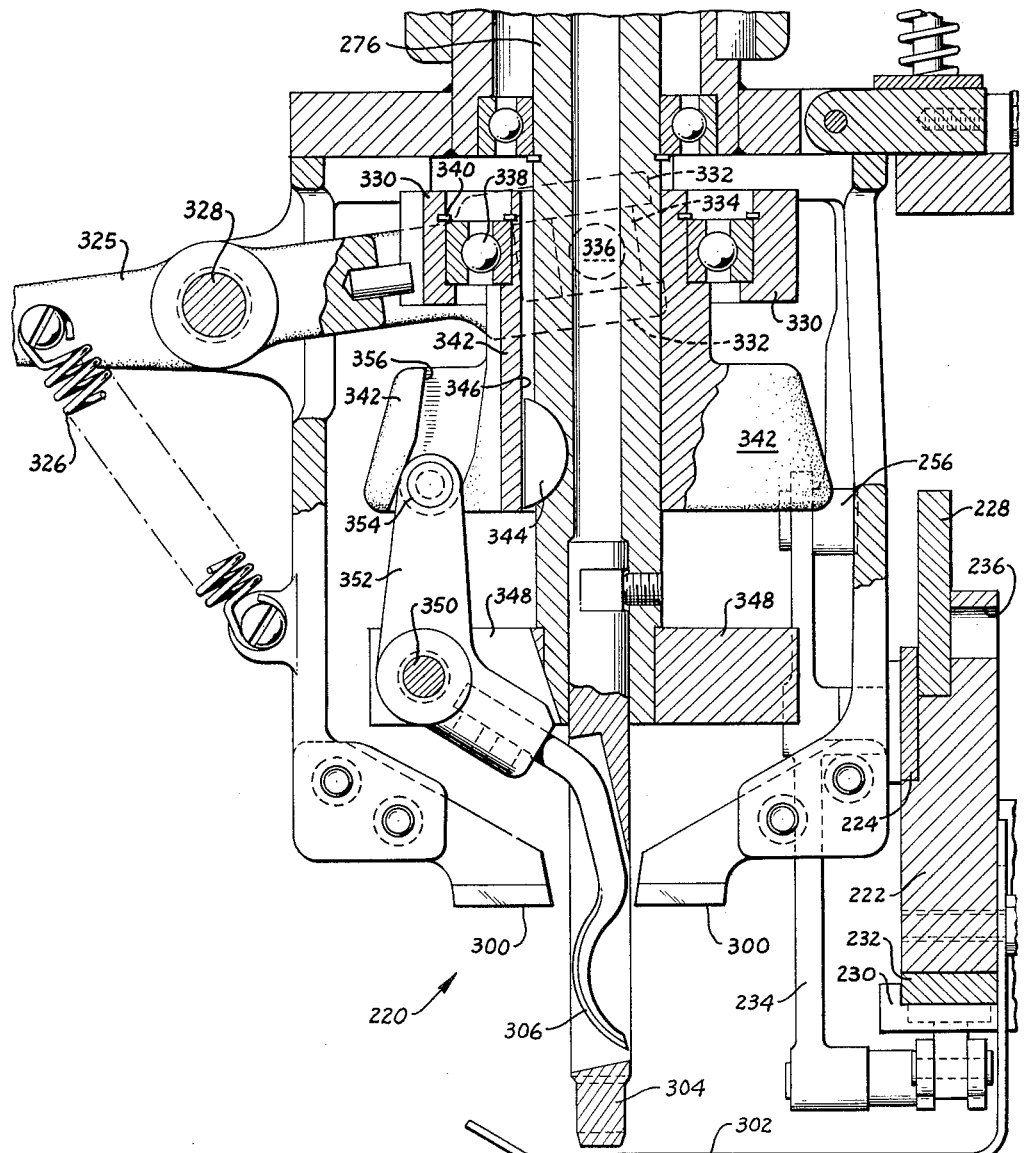
FIGURE 6 is an enlarged fragmentary sectional elevation of the apparatus of FIGURE 5.
Figure 7:
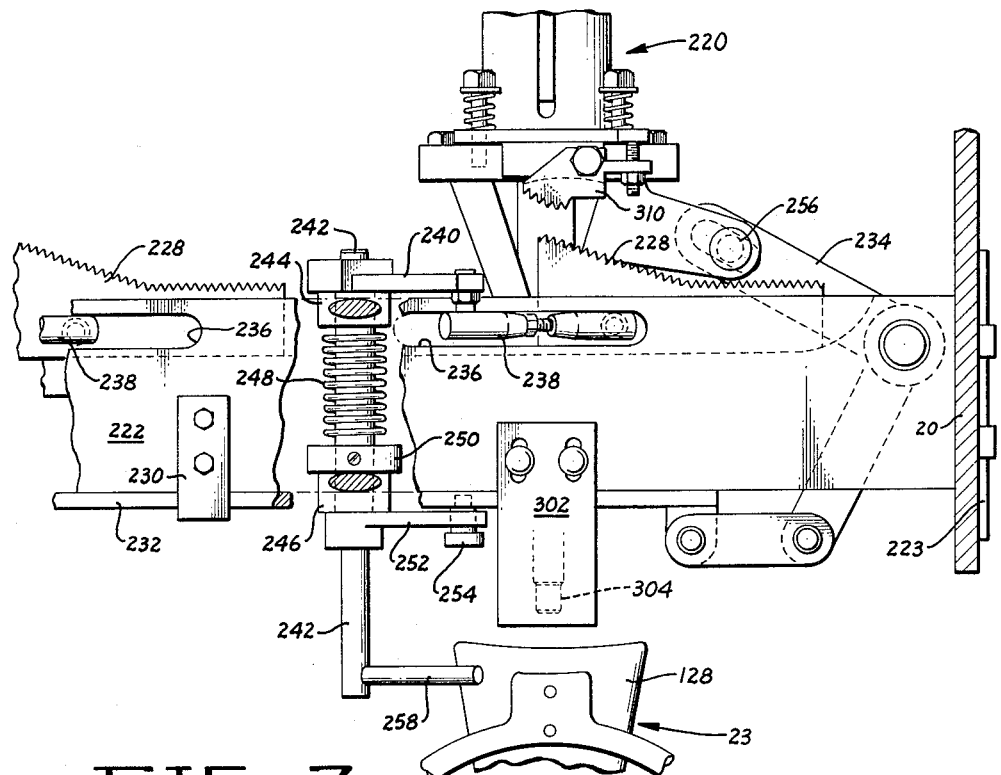
FIGURE 7 is an enlarged fragmentary view of an assembly for sensing the extent to which the gripper elements of the cups have been opened.
Figure 8:
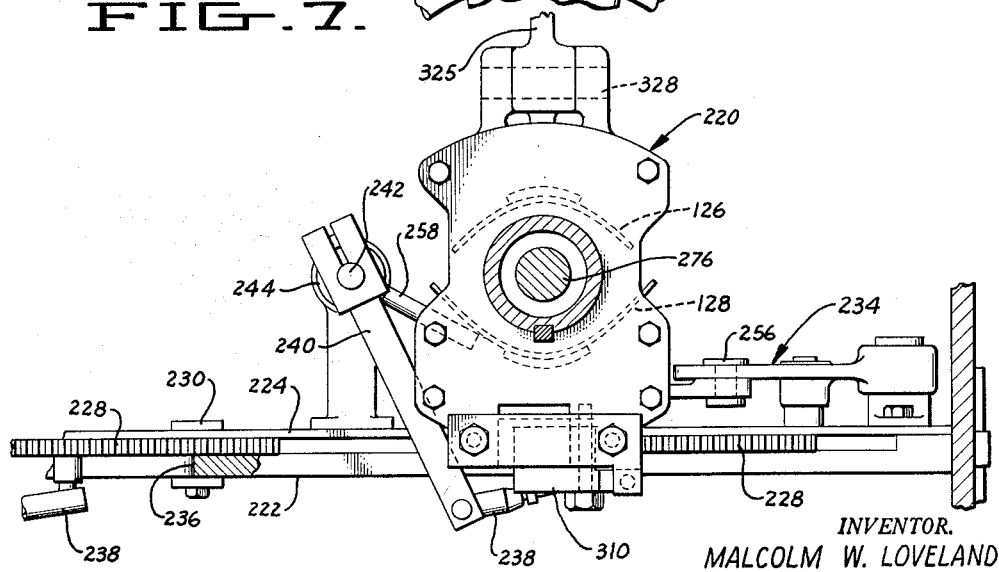
FIGURE 8 is an enlarged section on line 8—8 of FIGURE 5.

Attention is directed to FIGURES 7 and 8 wherein there is shown apparatus for sensing the size of a given pear so as to permit control of the quantity and location of material cut from the interior of the pear by the seed pod cutting knife. Bar 222 is supported by brackets 223 bolted to frame 20 at either end. The bar is machined to form a pair of shoulders (seen in FIGURES 5 and 6) on one of which rests plate 224. As may be seen especially in FIGURE 6, when plate 224 is in place, a pocket for cam 228 is formed. Suspended beneath the bar 222 by means of U-shaped clamps 230 is the sliding bar 232. This bar may slide either to the right or to the left, as seen in FIGURE 7, or in a direction normal to the plane of the paper of FIGURE 6. The bar 232 is controlled through the action of bell crank assembly 234 which is pivoted to the bar 222. Bar 222 has a horizontally elongated slot 236 and throttle linkage 238 may thus be secured to the cam 228 and the cam moved either right or left, as seen in FIGURE 7. The throttle linkage is controlled by lever arm 240 which is keyed to the pin 242 mounted in castings 244 and 246, bolted to the bar 222. Helical spring 248 bridges the space between casting 244 and ring 250, the latter being keyed to the pin 242 as is the lever arm 252. The spring is secured at either end so that the lever arm 252 is urged to the right, as seen in FIGURE 7. The distal end of the lever arm 252 rests against the downwardly depending pin 254. The pin 254 is tapped into the bar 232, which together provide means for forcing lever arm 252 to the left, as seen in FIGURE 7. The pin 256 which rides in the slot on the end of bell crank 234 is mounted in the casting of the overall coring assembly, so that as the lower portion of coring head assembly 220 descends, thus moving pin 256 downwardly, bar 232 will be slid to the right, as seen in FIGURE 7, and the feeler pin 258 which until this time is swung to the left to some degree and out of the way of any passing cups 23 (which are moving in a direction into the plane of the paper—FIGURE 7) will be permitted to rotate until it contacts a cup 23. Pin 258 will be permitted to rotate a greater or lesser distance, depending upon the extent to which a given cup 23 has been held by the pear therein.

Figure 2:
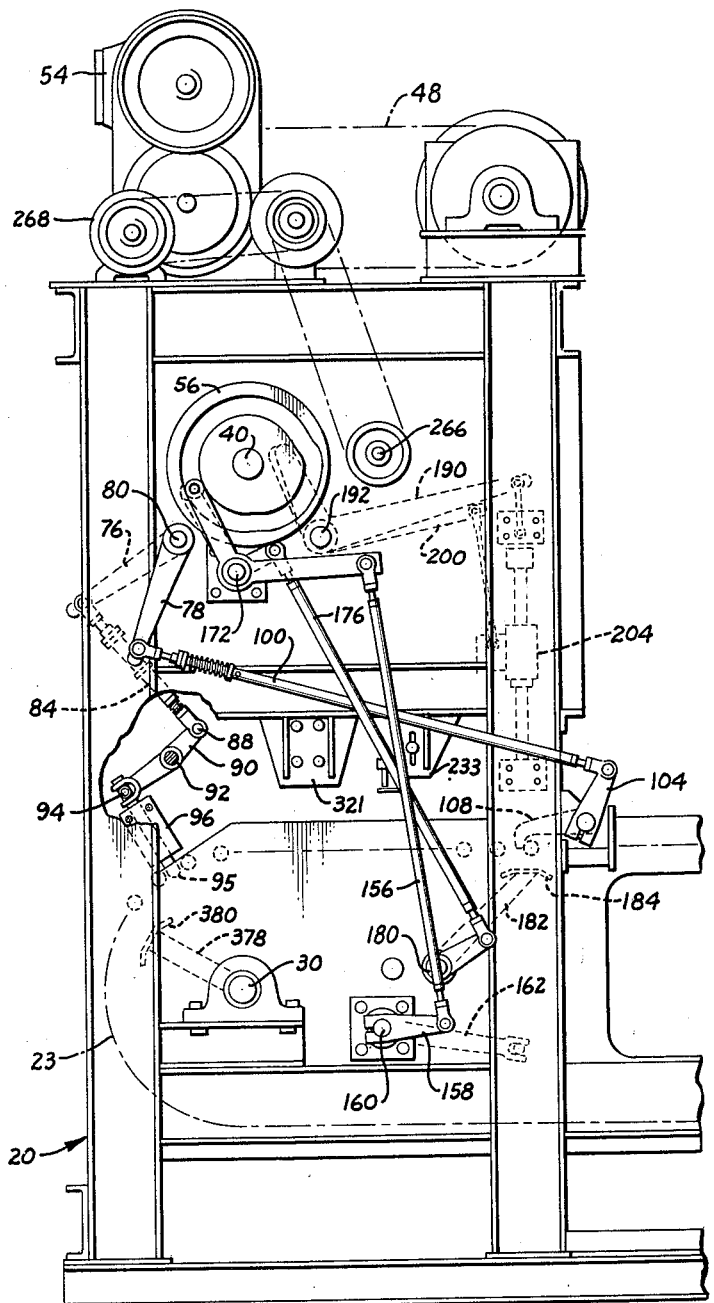
FIGURE 2 is a side elevation of the apparatus of this invention taken from the opposite side shown in FIGURE 1.
Figure 5:
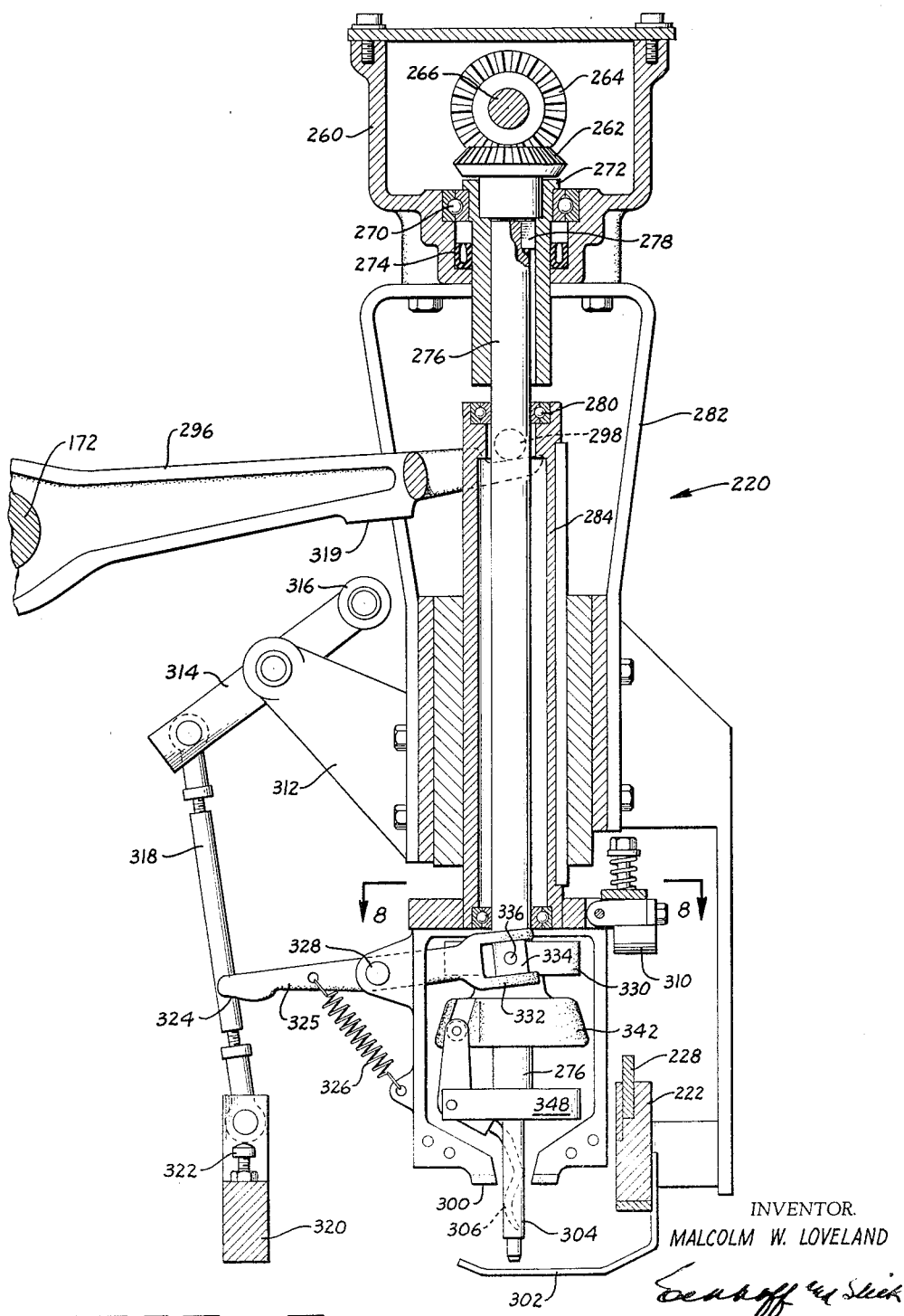
FIGURE 5 is an enlarged sectional side elevation of the coring head and associated apparatus for removal of the seed pod of a pear.

Attention is now directed to FIGURES 5 and 6, which show the apparatus used for removing the seed pod and which operates to enter a pear only a predetermined amount, depending upon the size of the pear, and to cut out an interior portion of the pear which is of increased diameter for largers pears. The coring head assembly seen in section in FIGURE 5 is suspended beneath the gear box 260 secured to the frame 20. Beveled gears 262 and 264, the latter keyed to shaft 226, transmit power from motor 268, as shown in FIGURE 2. Bearings 270 permit the sleeve 272 into which is pressed the beveled gear 262 to rotate freely with respect to gear box 260. Seal 274 insures against oil leakage. Internal shaft or spindle 276 is keyed to the sleeve 272. Feather key 278 rides in a keyway in the sleeve 272. The shaft 276 may drop with respect to the sleeve 272, while the shaft 276 will continue to rotate. Additional bearings 280 permit rotation of the internal shaft 276 relative to the housing 284 of the assembly 220. The lowermost portion of the assembly is supported by yoke 282 which is bolted to the gear box.

Figure 10:
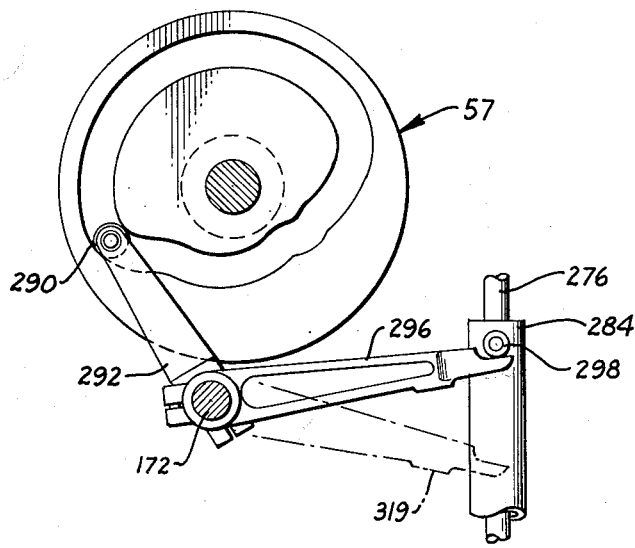
FIGURE 10 is an enlarged front elevation of a cam used to lift the coring head assembly following completion of a sequence of operations.

Attention is directed to FIGURE 10, wherein cam 57 is shown, which cam, through the action of roller 290, arm 292, clamped to shaft 172 journaled to the frame, and through the action of cam arm 296 also clamped to the shaft 172, controls the raising and lowering of the coring heads. Cam roller 298, on being permitted to drop to the level shown in phantom view in FIGURE 10, will permit the entire seed pod removal assembly to be lowered until a point is reached at which the knife edges 300 (FIGURES 5 and 6) pass between the slot in the V-shaped stripper 302 and engage the butt end of a pear.

The degree to which the knife shield 304 and the arcuate knife 306 which it houses enters the pear, whether to the depth shown in the first or in the second position of FIGURE 6, and the degree to which the knife is permitted to swing outwardly from its protective shield 304 so as to remove a greater or lesser quantity of seed pod material, depending on the size of the pear, is explained below.

Referring back to FIGURES 7 and 8, it will be seen that because of the upward slope of the left-hand portion of cam 228, the level to which the core head assembly descends may be controlled by sliding the cam to one side or the other so that pawl 310 carried by the core head assembly is permitted to descend a greater or lesser distance by striking the horizontal or inclined portion of the cam. If the cam 228 is moved to the right, as seen in FIGURE 7, thereby causing the pawl 310 to contact the cam 228 at a point where it is highest, the entire coring head assembly will not be permitted to descend as great a distance as would be possible if the cam 228 were farther to the left. The position of the cam 228 is governed by the action of feeler pin 258 which is permitted to swing a gerater or lesser distance to the right depending on whether a smaller pear or larger pear is carried in a cup, and on whether the cup jaws are thus spread a greater or lesser extent. This sensing mechanism thus controls the extent to which the lowermost portion of the coring head assembly 220 will be permitted to descend.

Referring again to FIGURE 5, there is shown bracket 312 to which is pivoted rocker arm 314 having a cam roller 316 at one end thereof and rod 318 pivoted to the other end thereof. Since the bracket is fixed to vertically immovable yoke 282, it will not drop as cam arm 296 descends. Since cam arm 296 is positioned directly above the roller 316 (FIGURES 5 and 10), the under surface 319 of the cam arm may contact the roller 316 which controls the movement of beam 320 slideably mounted in track assemblies 321 on either side of the frame 20 and having a set screw 322 mounted on the topmost edge thereof. As the beam 320 is raised, each set screw 322 will contact the underside 324 of lever 325, normally retained in a down position by means of spring 326. Each lever 325 is pivoted at 328. The opposite end of each finger 324 is provided with a yoke surrounding collar 330. Each side of the yoke has a fork 332 which grips blocks 334 through which pass pins 336, in turn secured in the collar 330. Bearings 338 are held in place by suitable shoulders and snap rings 340, thus to permit relative motion between the non-rotating collar 30 and the rotatable sleeve 342. Warren key 344 secured in the rotating shaft 276 registers with the keyway 346 causing the entire sleeve 342 to rotate and carrying with it the knife 306 which is pivoted to counter-weighted bracket 348 about pin 350. The knife is supported by crank arm 352, which is tapped at one end to receive the knife 306 and at the other end supports cam roller 354, riding in track 356 of the sleeve 342.

It will be seen that the extent to which that portion of the assembly 220 situated below bearings 280 is permitted to be lowered will in turn affect the degree of pivoting experienced by lever 325 and this in turn will govern the extent to which the knife 306 and its protective housing 304 enter a pear, with greater penetration being accomplished with larger pears. Also, because of the slight outward curve of the track 356, deeper penetration of the pear will be accompanied by a more extensive pivoting about pin 350 with a larger quantity of seed pod material being removed from the center of the pear. Since the knife is constantly rotated at high speed, the seed pod material is finely divided following the cutting action and can be easily flushed out with a jet of water.

To provide means for removing the pears, cam 55 (FIGURE 1) guides roller 360 supported by arm 362 clamped to stub 364 journaled in the frame 20. Arm 366 is similarly clamped to the stub 364 and pivoted thereto is rod 368. At the other end thereof is pivoted arm 370 clamped to stub 372. Arm 373 is also clamped to stub 372, and pivoted to the end thereof is the additional rod 374. Wrist pin 375 has additional arm 376 which, with arm 378, forms a bell crank pivoted about shaft 30 on the distal end of which is mounted the cam 380.

*Operation*

Attention is directed to FIGURE 13. At each of seven stations (FIGURE 14) cam 69 causes the detents 95 and 103 to drop into place between cross links of the chain conveyor at either side thereof so as to lock the chain firmly in place. Since the advancement of the conveyor 22 is on an intermittent basis, the locking members are provided merely as further protection against pear cups being improperly positioned at a time when it is desired to perform various operations on pears therein.

Figure 9:
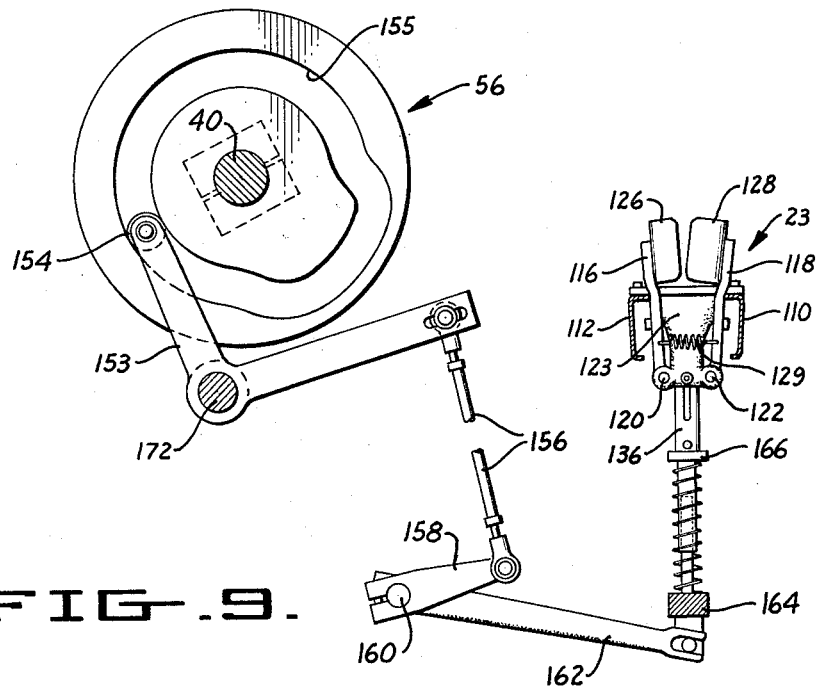
FIGURE 9 is an enlarged front elevation of a cam used to lift all pears to a predetermined height.

As a pear placed butt end up in a cup moves from right to left in FIGURES 11, 12 and 14, and reaches Station I and is locked therein, hollow coring tube 206 descends and severs completely the core material from the center of the pear. Simultaneously with the beginning of upward motion on the part of the coring tube 206, the action of cam 56 causes the lifter 166 which, as seen in FIGURE 9, rests on a light compression spring, to force upwardly against the base of tubular plunger 136 so that the support from below provided by the plunger 136, together with the lifting action provided by withdrawing of the core tube 206, tends to lift the pear until it strikes the V-shaped stripper member 207. The spring loading feature assures that the pear will be forced upwardly only until its uppermost edge has reached the plane of the stripper; the compression spring used is sufficiently light that the pear will not be crushed. As the core tube begins retracting the kick-out punch 194 descends and strikes the material within the core tube to clear it from the tube and perhaps from the pear itself. Through the action of the cam 62 seen in FIGURE 14 the cam 184 presses upwardly against the roller 144 and opens jaws 126 and 128 to permit the pear to be lifted. The jaws are opened before the core tube is retracted.

The core tube 206 is totally withdrawn and the kick-out punch 194 which has either driven the cylindrical core material entirely out of the pear or to a point where only a small portion of its remains in the stem end thereof, returns to its raised position. Cam 60 turns to release the various detents 95 and 108 and the ratchet mechanism driven eccentric advances the conveyor to Position II, at which point cam 60 again causes a locking action. At this station, the second kick-out punch 208 decends to remove entirely the cylindrical core and the detents 95 and 108 are again withdrawn, released, and the conveyor indexed to Station III. As a cup approaches this position (the conveyor moving into the plane of the paper in FIGURE 7 or upwardly from the bottom in FIGURE 8), bell crank arm 234 is in an uppermost position which forces the pin 254 to rotate arm 252 to the left, thus forcing the feeler pin 258 out of the path of the advancing cup. When the cup has reached Station III and the detents 95 and 108 are lowered into "lock" position, cam 57 (FIGURE 10) lowers the head assembly together with pin 256, which is tapped into the casting of the core head assembly housing. The upper arm of the bell crank 234 moves in a counter-clockwise direction (FIGURE 7). This action slides bar 232 toward the right and the helical spirng 248 moves lever arm 252 and feeler pin 258 toward the right until such time as the finger contacts a cup containing a pear. The cam 228 simultaneously is moved to the right to a greater or lesser degree depending on the spread of jaws 126 and 128, and the lowermost portion of the coring head assembly drops until pawl 310 strikes cam 228. The knife 306, its tubular housing 304, counter-weighted bracket 348, sleeve 342, and spindle or shaft 276 continue to turn at high speed. When the cam surface 319 strikes the roller 316 (which action occurs only after the knife 306 and its housing 304 have entered the cylindrical hole produced by the core tube 206 and have stopped descending) the set screw 322 will be caused to raise until it contacts the finger 324 so as to cause the collar 330 and sleeve 342 to move downwardly. The farther sleeve 342 and the integral cam track 356 drop, the greater will be the resulting pivoting of crank arm 352. And since lever arm 314 is vertically fixed, the contact point (set screw 322) thereof will always describe the same cycle but will cause a greater or lesser movement of the contact point (finger 324) of the lever 325, depending on whether the two surfaces 322 and 324 are nearer together or farther apart when surface 319 first contacts roller 316. Thus, a setting of cam 228 (because of a small pear) such that pawl 310 contacts a sloped portion thereof results in a smaller penetration of knife 306 and a lesser outward pivoting thereof (since lever 325 has not been lowered as far), thus to cause a lesser quantity of seed pod material to be severed than if pawl 310 contacted the horizontal portion of cam 228.

The process just described is then reversed, with cam arm 296 raising the entire assembly after knife 306 has retracted into the protective housing 304. The detents 95 and 108 are then again withdrawn through the action of cam 60 and the pear indexed to the station designated IV. At Station IV, a stream of water may be provided by tubes, not shown, so as to wash free any core or seed pod material remaining in the pear. The pear is indexed to Station V, where further washing may take place, and thereafter to Station VI where no operation is performed in the structure disclosed here. At Station VII, cam 55 is initially in the position shown in FIGURE 1, but as it rotates causes roller 360 and arm 362 to move in a clockwise direction. Through the action of the various levers, cam 380 is moved counterclockwise so as to contact roller 144 of the cup assembly 23, thus opening the jaws 126 and 128. Spindles may then be used to impale and remove the pears in the cups.

Further understanding of the operation of the machine will be gained from FIGURE 15, the timing chart. The duration of various operations is based upon a full 360° cycle of shaft 40 upon which the cams controlling the various operations are mounted. For ease of reference, sections of each of the bars have been labeled with letters together with the required numbers of degrees.

The first bar is labeled "Cup Index" and refers to the action of the conveyor 22. During a 180° portion of a complete revolution of each of the cams, the conveyor is stationary (Condition A) and during a 180° portion of the conveyor is advanced (Condition B).

From the second bar labeled "Conveyor Lock" representing the action of cams 60 (FIGURE 13) which control the locking detents 95 and 108, it may be seen that during "A" detents 95 and 108 are moving into a locked position as shown in FIGURE 13; in "B", the detents are stationary and are locked in place as shown in FIGURE 13 so that the conveyor may not move; during "C", the detents are being lifted so as to unlock the chain; during "D", the chain remains unlocked and the cups may be indexed to the next position; during "E", the detents remain in a retracted position; and during "F", the detents are again beginning to move into a locked position. The action "A" simply represents a continuation of the action represented by "E".

From the third bar labeled "Coring Tube," which deals with the operation of cams 59 of FIGURE 12, it may be seen that during the period "A" the assembly 204 and core tube 206 remain stationary before beginning a descent; during the period "B," the tube is moving downward; during "C," the core tube is dwelling in a down position; during "D," the tube is moving upwardly through the action of cam 59; and during "E," the entire assembly 204 is raised and inactive.

From the fourth bar designated "Core Knock-Out Punch," it may be seen that during "A" the punch 194 governed by cams 58 is in a raised position immediately prior to beginning its descent; during "B," the punch is moving downwardly; during "C," the punch is moving upwardly; and during the remaining period "D," the punch remains retracted.

From the fifth bar, one can see the timing of cam 56 (FIGURE 9) relative to other operations performed during the course of a complete cycle. During "A," the orientation of the cam is such that the lifter plate 166 remains down and plunger 136 is also in its lowermost position; during "B," plate 166 begins to move upwardly to contact the bottom of the plunger 136; during "C," while the cup jaws 126 and 128 (as will be detailed immediately hereinafter) are open and the coring tube is being retracted, the plunger is either being lifted or, in the alternative, if the butt end of the pear has contacted one of strippers 207, the spring upon which rests the lifter 166 is being compressed to prevent damage to the fruit; during "D," the plunger 136 is held in a raised position by dog 132 and ratchet 134; during "E," the action of the cam 56 permits lifters 166 to return to their original position; while during the time represented by "F," the lifters remain in a lowered position.

From the sixth bar labeled "Cup Jaw Control—Station I," it is possible to see the manner in which cam 62 of FIGURE 14 is timed with the others. This cam controls the action of cam 184 which opens the cup jaws at Station I so that a pear may be lifted, in part through the action of plunger 136. The designation "A" indicates that period during which cam 184 is maintained stationary in the position shown in FIGURE 14. The designation "B" represents the time during which the cam 184 is being raised so as to force roller 144 upwardly and open the jaws immediately before the coring tube 206 is retracted; during "C," the stem tube 206 is being retracted and the jaws remain open so as to permit a pear to be lifted; the designation "D" refers to the time period during which cam 184 is being returned to the position shown in FIGURE 14 and the jaws of the cups are being closed; throughout the remainder of the time period to conclude a full 360°, represented by "E," the cam 184 remains in the down position as shown in FIGURE 14.

The seventh bar labeled "Seed Pod Removal Head" indicates the operation of cams 57 which raise and lower the seed pod removal assembly; during "A," the head is descending and the knife and tube 304 are moving into the pear; during "B," the cam surface 319 bears upon roller 316, causing the knife 306 to pivot outwardly from its protective housing while the downward motion of the knife itself is stopped by contact of pawl 310 and the cam 228 which has been preset in response to the degree to which the jaws of cup 23 have been opened; during "C," the knife is in an extended position and is cutting the seed pod free of the pear; during "D," the cam arm 296 moves upwardly so as to release finger 324, permitting the knife to return to the housing 304; during the period "E," the roller 316 is released and lifting of the entire lowermost portion of the assembly 220 through the action of cam arm 296 is begun; during the period "F," cam arm 296 is motionless and in an elevated position; during the period "G," the cam arm 296 is again beginning to move downwardly.

Finally, attention is directed to the bar labeled "Cup Jaw Control—Station VII" which indicates the relationship of motions caused by cam 55 (FIGURE 1) to the other operations just discussed. Cam 55 governs the opening of the cup jaws 126 and 128 at Station VII by moving cam 380 into contact with the roller 144 at the conclusion of the entire operation. During "A," the cam 380 is in the position shown in FIGURE 1 and the jaws are closed; during "B," the cam 56 causes cam 380 to swing counter-clockwise as seen in FIGURE 1 so as to contact the roller 144 to open the jaws of the cup 23; during "C," the jaws remain open, with the cup stopped at a point where the pear may be impaled by a spindle and removed; during "D," the cam 380 is moving away from the roller 144 and the jaws are permitted to close; during "E," the jaws remain closed. It should be noted that as the roller 144 is lifted, member 131 mounted on arm 116 is also swung backwardly, so that dog 132 no longer engages ratchet 134, thus permitting the plunger 136 to return to its rest position.

While reference has been made to a single cup 23, to a single coring tube assembly, as shown in FIGURE 12, and to a single kick-out punch, as shown in FIGURE 11, together with a single seed pod removal assembly, the machine in reality incorporates a plurality of these units laterally spaced so that when the machine is viewed in end elevation a total of eight seed pod removal assemblies and eight rows of cups and associated coring tubes and knock-out punches may be seen.

Obviously, many modifications and variations may be made without departing from the spirit and scope of this invention, and therefore only such limitations should be imposed as are indicated in the appended claims.

I claim:

1. In a machine for removing the seed pods from pears:
   (a) a cup for holding said pears, said cup incorporating a pair of jaws, at least one of which can be moved toward and away from the other to accommodate pears of differing thicknesses;
   (b) means for determining the extent to which the said jaws are spread whereby to determine the thickness of a pear therein;
   (c) a knife rotatably mounted on a support therefor, said support being mounted for reciprocating movement toward and away from one end of a pear in said cup, said knife being mounted in a position to permit contact with a pear at an end thereof and to permit penetration of the said one end of said pear,
   (d) and means in communication with the means of (b) above and said knife for permitting said last-mentioned means to control the depth of penetration of said knife into the said one end of said pear in response to information supplied by the means of (b) above.

2. In a machine for removing the seed pods from pears:
   (a) a cup for holding said pears, said cup incorporating a pair of jaws, at least one of which can be moved toward and away from the other;
   (b) means for determining the extent to which said jaws are spread whereby to determine the thickness of a pear therein;
   (c) a knife pivoted to a support therefor and mounted for rotation, said knife being encompassed by a sheath therefor when in a first position and being extended laterally from the said sheath when in a second position, said knife being mounted to permit contact thereof with a pear at an end thereof;
   (d) and means in communication with the means of (b) above and said knife for permitting the last-mentioned means to control the extent to which the said knife pivots from the said sheath in response to information supplied by the said means of (b) above.

3. In a machine for removing core material and seed pods from pears:
   (a) a cup for holding said pears, said cup incorporating a pair of jaws, at least one of which can be moved toward and away from the other to accommodate pears of differing thicknesses;
   (b) means for removing a core section from a pear;
   (c) means for determining the extent to which the jaws of the said cup are spread whereby to determine the thickness of a pear therein;
   (d) a knife pivoted to a support therefor, said support being mounted for reciprocating movement toward and away from a pear in said cup, said knife being mounted in a position to permit entry of said knife into a hole formed by the removal of a core section from a pear;
   (e) means in communication with the means of (c) above and the said knife for permitting said last-mentioned means to control the depth of penetration into a pear by said knife in response to information provided by the means of (c) above;
   (f) and means in communication with the means of (c) above and said knife to control the extent to which the said knife is permitted to pivot from the said support therefor in response to information supplied by the means of (c) above.

4. In a machine for removing seed pods from pears:
   (a) an endless conveyor having drive means for advancing said conveyor in a step-wise fashion;
   (b) a plurality of cups for holding pears mounted in a row on the said conveyor, said cups each incorporating a pair of jaws, at least one of which may be moved toward and away from the other to accommodate pears of differing thicknesses;
   (c) means for determining the extent to which said jaws are spread whereby to determine the thickness of pears therein;
   (d) a housing mounted over said conveyor directly over the path of travel of the said cups, said housing having a rotatable spindle therein, said spindle being mounted for reciprocating movement relative to the said housing therefor;

(e) a knife pivotally mounted on the said spindle, said knife being mounted in a position to permit contact of said knife with ends of pears when said spindle moves toward a pear as part of its reciprocating movement;

(f) and means in communication with the means of (c) above and said knife for permitting said last-mentioned means to control the depth of penetration by said knife into a pear and the extent to which the said knife pivots from the said spindle in response to information supplied by the means of (c) above.

5. In a machine for removing seed pods from pears:

(a) an endless conveyor having drive means for advancing said conveyor in a step-wise fashion;

(b) a plurality of cups for holding pears mounted in a row on the said conveyor, said cups each incorporating a pair of jaws, at least one of which may be moved toward and away from the other to accomodate pears of differing thicknesses;

(c) a finger fixed along the path of travel of the said cups for contacting a movable cup jaw to determine the extent to which said jaws are separated;

(d) a housing mounted over the path of travel of said cups, housing having journaled therein a spindle, said spindle being mounted for reciprocating movement;

(e) an acruate knife pivoted to the said spindle, said knife being mounted in a position to permit contact thereof with the said pear at an end thereof when said spindle is moved toward a pear as part of its reciprocating movement;

(f) and means in communication with the means of (c) above and said spindle for permitting said last-mentioned means to control the depth of penetration by said knife into said pear in response to information supplied by the means of (c) above, together with means in communication with the said means of said (c) above and said knife for permitting said last-mentioned means to control the degree of pivoting of said knife relative to the said spindle in response to information supplied by the means of (c) above.

6. In a machine for removing seed pods from pears:

(a) an endless conveyor having drive means therefor and a plurality of stations positioned therealong, said conveyor being driven in an intermittent fashion to stop at each of the said stations;

(b) cups mounted on the said conveyor, said cups being so mounted that each cup thereon will stop at each of the said stations during the course of one complete transit about the endless conveyor, each of said cups incorporating a pair of jaws, at least one of which may be moved toward and away from the other;

(c) means at a first station for determining the extent to which said jaws are spread whereby to determine the thickness of a pear therein;

(d) means positioned at a subsequent station along the path of travel of said conveyor for removing seed pod material from the said pear, said means including a housing having a spindle journaled therein, said spindle being mounted for reciprocating movement toward and away from said cups, a knife pivoted to the said spindle and being mounted in a position such that it may be permitted to contact a pear in one of the said cups when said spindle is moved toward a pear as part of its reciprocating movement;

(e) and means in communication with the means of (c) above and said spindle for permitting the said last-mentioned means to control the depth of penetration of said knife into said pear by moving said spindle toward and away from said pear in response to information supplied by the means of (c) above.

7. In a machine for removing cores and seed pods from pears:

(a) a conveyor supporting a cup for holding said pears, said cup incorporating a pair of jaws, at least one of which may be moved toward and away from the other, and having an opening in the bottom thereof;

(b) means for determining the extent to which said jaws are spread whereby to determine the thickness of a pear therein;

(c) plunger means in said cup opening for exerting pressure against the lowermost end of a pear in said cup to raise the said pear to a predetermined level whereat the said pear may be cored and the seed pod material removed therefrom;

(d) a hollow coring tube mounted over the path of travel of said cup and having means operatively associated therewith for forcing said coring tube into the said pear whereby to sever a core section therefrom;

(e) a housing positioned over the path of travel of the said cup at a point subsequent to said coring tube, said housing having a spindle journaled therein, said spindle being capable of reciprocating movement relative to the said cup;

(f) an arcuate knife pivoted to the said spindle, said knife being mounted in a position to permit entry into a preformed core hole in a pear carried by the said cup during the course of reciprocating movement of the said spindle;

(g) and means in communication with the means of (b) above and said spindle for permitting said last-mentioned means to control the depth of penetration into the said pear of the said knife in response to information supplied by the means of (b) above, and means in communication with the means of (b) above and said knife for permitting said last-mentioned means to control the extent to which the said knife is pivoted when in the said pear.

8. In a machine for removing seed pods from pears:

(a) a cup mounted on an endless conveyor for holding a pear, said cup incorporating a pair of jaws, at least one of which can be moved toward and away from the other;

(b) means for determining the extent to which said jaws are spread whereby to determine the thickness of a pear therein;

(c) a cam operatively associated with the means of (b) above, said cam having a lobe thereon so positioned that when the said jaws are spread the said lobe will be moved into a first position and when the said jaws are relatively more closed, the said lobe will be moved into a second position;

(d) a housing mounted over the path of travel of the said cup and having a spindle journaled therein, said spindle being mounted for reciprocating movement;

(e) a knife mounted on the said spindle in a position to permit contact of said pear with the said knife during the coure of movement of the spindle toward a cup;

(f) and means for limiting the extent of movement of said spindle toward a cup, said means comprising a stop member carried by the said spindle and positioned to contact the said cam of (c) above as the spindle is moved toward a cup.

9. in a machine for removing seed pods from pears:

(a) a cup for holding said pears, said cup incorporating a pair of jaws, at least one of which is capable of being moved toward and away from the other;

(b) means for determining the extent to which said jaws are spread whereby to determine the thickness of a pear therein;

(c) means for removing a seed from a pear held in said cup, said means comprising a housing fixed above the said cup, said housing having a spindle journaled therein, said spindle having a bracket secured thereto;

(d) an arcuate knife pivoted to said bracket at a point spaced from the said spindle;

(e) a cam keyed to said spindle whereby to be rotatable with said spindle and mounted to reciprocate relative thereto and coaxially thereof;

(f) a cam follower operatively associated with said knife, said follower and said cam being in contact with one another, said cam being shaped to cause said knife to pivot outwardly when said cam is moved from a rest position in a predetermined direction and to pivot inwardly when said cam is returned to said rest position;

(g) and means responsive to the said means of (b) above for moving said cam in said predetermined direction to a greater or lesser extent depending upon the information provided by the means of (b) above whereby to cause said knife to pivot to a greater or lesser extent.

10. In a machine for removing seed pods from pears:

(a) an endless horizontally-mounted conveyor;

(b) a series of cups mounted on the said conveyor, each of said cups incorporating a pair of jaws, at least one of which may be moved toward and away from the other;

(c) means for determining the extent to which said jaws are spread whereby to determine the thickness of the pear held therein;

(d) a seed pod removal mechanism, said mechanism comprising a frame fixed over the path of travel of said cups, said frame having a housing positioned therebeneath, said housing having a spindle journalled therein, said housing and said spindle being mounted for reciprocating movement relative to the said frame;

(e) means mounted on the said frame for rotating the said shaft;

(f) a first lever mounted on the said frame;

(g) a second lever mounted on the said reciprocating housing, each lever having a contact point for the other thereon, said contact points normally being spaced from one another whereby said first lever may be caused to control the said second lever;

(h) a cam keyed to the said spindle whereby to rotate therewith and mounted to reciprocate relative thereto and coaxially thereof, said cam being supported by said second lever;

(i) a knife pivoted to the said bracket, said knife having an arcuate knife blade on one end thereof and a cam follower on the other end thereof and being pivoted at an intermediary point, said cam follower registering with the last-mentioned cam, said cam being so shaped that when the said cam moves from a rest position in a predetermined direction the said knife will be pivoted outwardly, and when the said cam returns to said rest position, the said knife will be pivoted toward the said spindle;

(j) and means for moving said first lever through a predetermined cycle irrespective of the position of the said reciprocating housing whereby when said housing is in a first position the said means will cause a greater pivoting of said second lever and of said knife and a lesser pivoting of the said second lever and of the said knife in a second position.

References Cited in the file of this patent
UNITED STATES PATENTS

| | | |
|---|---|---|
| 2,742,066 | Carroll | Apr. 17, 1956 |
| 2,969,098 | Creed | Jan. 24, 1961 |
| 3,078,839 | Buchner et al. | Feb. 26, 1963 |